United States Patent
Wilson

[15] 3,691,549
[45] Sept. 12, 1972

[54] SIGNAL PROCESSOR
[72] Inventor: Dennis L. Wilson, Palo Alto, Calif.
[73] Assignee: Sylvania Electric Products, Inc.
[22] Filed: Dec. 2, 1970
[21] Appl. No.: 94,404

[52] U.S. Cl. .............................. 340/261, 340/258 D
[51] Int. Cl. ............................................. G08b 21/00
[58] Field of Search ........ 340/261, 258 D, 258 R, 15, 340/15.5 GC, 16, 276

[56] References Cited
UNITED STATES PATENTS
2,942,247  6/1960  Lienau et al. .......... 340/261 X
3,455,148  7/1969  Foster et al. ........... 340/261 X Primary Examiner—John W. Caldwell
Assistant Examiner—Michael Slobasky
Attorney—Norman J. O'Malley, Russell A. Cannon and John F. Lawler

[57] ABSTRACT

A geophone senses seismic vibrations in the earth and converts them to electrical seismic signals which are amplified and filtered in an active bandpass filter-amplifier having automatic gain control and a 10–40 Hz. passband. The amplified and filtered signal is rectified in a first full-wave rectifier, is subsequently filtered in a circuit having a 1–4 Hz passband. characteristic, and is again rectified in a second full-wave rectifier. The latter rectified signal is summed by an integrator over a 10-second time interval and is applied to a threshold circuit. If the sum signal exceeds a prescribed threshold level, the threshold circuit produces an output signal indicating that the seismic vibrations are burst-type seismic vibrations such as are produced by a man walking in the area of detection of the geophone.

10 Claims, 8 Drawing Figures

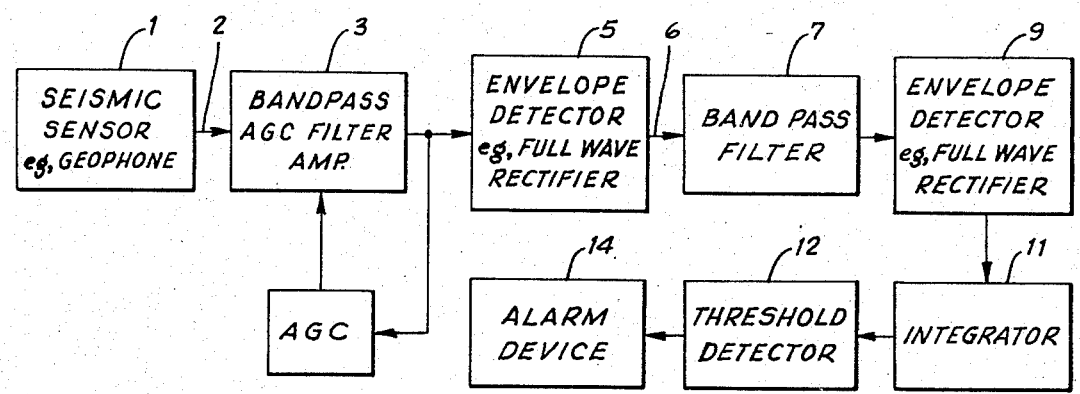
FIG_1
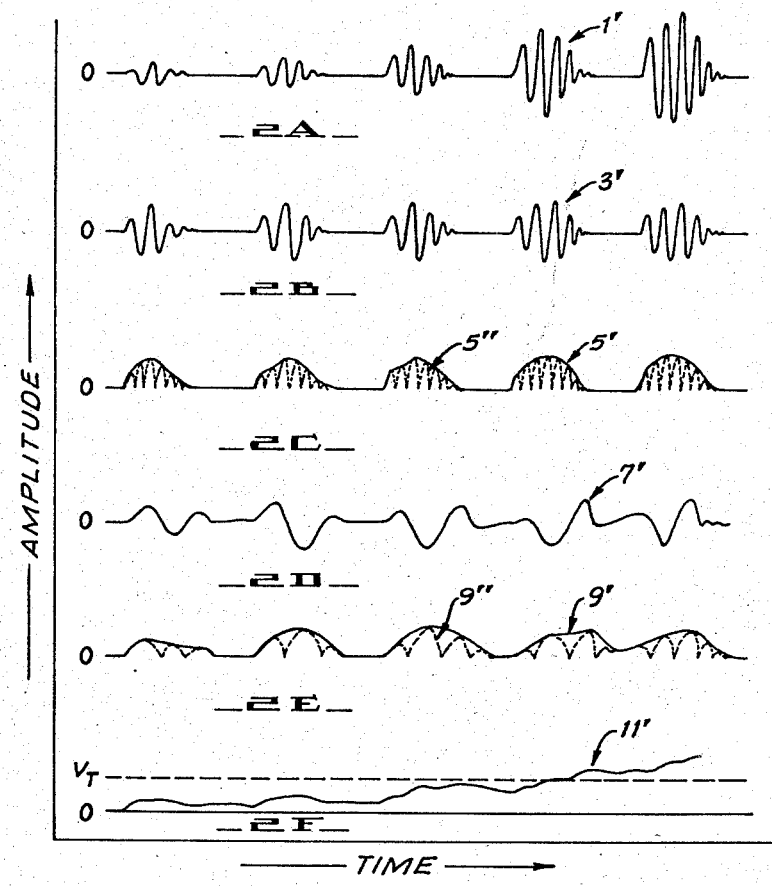
FIG_2
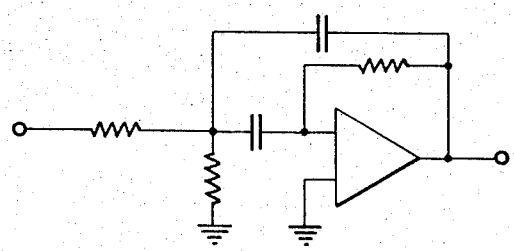
FIG_3
DENNIS L. WILSON
INVENTOR.
BY Russell A Connor
AGENT

SIGNAL PROCESSOR

BACKGROUND OF INVENTION

This invention relates to seismic intrusion detection systems and more particularly to a signal processor for such systems.

Seismic intrusion detection systems are employed to detect men walking in a protected area. Detection is accomplished by locating a geophone on or in the earth within the protected area. The geophone converts vibrations in the ground to a varying seismic signal voltage that is comprised of spectral components having amplitudes and frequencies related to these vibrations. It is desirable that the system produce an alarm in response to seismic signals caused by a man walking in the protected area without producing false alarms in response to seismic signals caused by sources such as wind, rain and aircraft. A prior art signal processor for accomplishing this function detects the energy in the seismic signal and produces an alarm if the magnitude thereof exceeds a prescribed threshold level. This processor has poor discrimination against seismic signals caused by sources of false alarm, however, since an alarm is produced whenever seismic signals of sufficient energy are caused by any source. A more sophisticated signal processor generates a signal proportional to the difference between the energies in the low and high frequency spectral components of a seismic signal for discriminating between seismic signals caused by a man walking and those caused by sources of false alarm. An alarm is produced only when the amplitude of this difference signal exceeds a prescribed threshold level. Although the false alarm rate of the latter processor is relatively low, the processor is complex and has a false alarm rate that is higher than that desirable for certain applications.

An object of this invention is the provision of an improved seismic signal processor that is relatively simple and provides good discrimination between seismic signals caused by a man walking and those caused by wind, rain and aircraft.

SUMMARY OF INVENTION

In accordance with this invention, burst seismic signals caused by a walking man are distinguished from continuous seismic signals caused by sources of false alarm by comparing with a prescribed reference level the energy in a selected band of low frequency components of an envelope signal that is normalized by automatic gain control and is derived from a seismic signal.

BRIEF DESCRIPTION OF DRAWINGS

FIG. 1 is a block diagram of a seismic intrusion detection system embodying this invention;

FIGS. 2A-2F are waveforms useful in explaining the operation of the system of FIG. 1; and FIG. 3 is a schematic circuit diagram of a bandpass filter in the system of FIG. 1.

DESCRIPTION OF PREFERRED EMBODIMENT

Referring now to FIG. 1, a processor embodying this invention comprises filter-amplifier 3, a first envelope detector 5, bandpass filter 7, a second envelope detector 9, integrator 11 and threshold detector 12 connected in series between seismic sensor 1 and alarm device 14. An automatic gain control (AGC) circuit 4 is connected across amplifier 3. The waveforms designated by primed reference characters in FIGS. 2 represent the output signals of associated components designated by the same unprimed reference characters in FIG. 1. The waveforms in FIGS. 2 illustrate the operation of the system in FIG. 1 in response to seismic vibrations produced in the ground by a walking man.

The seismic sensor 1 may, by way of example, be a geophone which is an acoustic transducer that is placed in contact with the earth. A seismic vibration in the earth is detected by the geophone which produces an electrical seismic signal $1'$ (see FIG. 2A) on line 2 comprising all of the frequency components reproduced by the geophone. A walking man periodically produces burst-type seismic vibrations of short duration that result in burst seismic signals $1'$ that are characterized by strong low frequency spectral components having frequencies of less than 50 Hz and envelopes having short rise and fall times. Although a burst seismic signal $1'$ caused by a walking man may include spectral components having frequencies from approximately DC to something greater than 100 Hz, the amplitudes of the high frequency components having frequencies greater than 70 or 80 Hz are normally very low. The envelopes of seismic burst signals have rise times that are typically shorter than 0.1 second and durations having nominal values in the order of 0.25 second. Rain, helicopters and other aircraft produce non-burst or continuous seismic vibrations of a much longer duration that result in continuous seismic signals that are characterized by spectral components extending over a broad band of frequencies and envelopes having long rise and fall times. The envelopes of continuous seismic signals have rise times that are generally longer than 1 second and durations that are typically several seconds long although such signals may extend for much longer periods. Occasionally the envelopes of continuous signals may have abrupt changes in amplitude that are generally spaced more than 10 seconds apart. The amplitudes of the seismic signals on line 2 vary considerably depending on the proximity of a seismic source such as a walking man to the geophone.

Circuit 3 is an active filter comprising reactive elements and an amplifier having AGC circuit 4 connected between the output and an input thereof. The amplifier increases the amplitude of low level signals on line 2 so that they can be operated on by subsequent processing circuitry. The AGC changes the gain of the amplifier to maintain a measure of the amplitude of the seismic signal essentially constant regardless of the strength of a seismic signal $1'$. This measure may be the average or peak value of the signal $1'$. The output signal of circuit 3 is represented by the waveform $3'$ in FIG. 2B. This circuit also causes the shapes of the envelopes of signals $1'$ and $3'$ to be similar even though the amplitude of the former signal may vary considerably. The attack time of the AGC amplifier is preferably approximately equal to the rise time of a burst signal, e.g., 0.1 second. The decay time of the AGC amplifier is preferably long compared to the time between footsteps which is approximately 0.8 second. By way of example, the decay time may be 10 seconds. Filter 3 has a wide frequency passband for passing strong low frequency spectral components of a burst seismic signal 1' caused by a walking man. The lower cutoff frequency of filter 3 is selected to be high enough to block extremely low frequency spectral components such as are caused by thunder and to reduce the 1/f noise of the system. By way of example, the lower cutoff frequency is preferably greater than 5 Hz. The upper cutoff frequency of this filter is selected to pass strong spectral components in a burst seismic signal that is produced by a walking man but to reduce the noise in the system. A burst seismic signal may comprise strong spectral components having frequencies extending up to 70 or 80 Hz. The upper cutoff frequency of filter 3 is therefore preferably less than 100 Hz. In an embodiment of this invention which was successfully built and tested, filter 3 had a 10–40 Hz filter passband and a rolloff of 6 db per octave.

Envelope detector 5 preferably comprises a full-wave rectifier for causing all variations in the amplified signal 3' to be of the same polarity (see waveform 5" in broken lines in FIG. 2C) and a low pass filter on the output thereof for smoothing out the variations in the rectified signal 5" and producing the envelope signal 5' (see the solid curve in FIG. 2C). Alternatively, circuit 5 may be a half-wave rectifier or other nonlinear detector. The envelope signal 5' is comprised of a plurality of spectral components having different frequencies extending down to DC.

It has been determined that the energy in spectral components of a rectified burst signal 5' having frequencies between 1 and 4 Hz is much greater than that in the same spectral components of rectified continuous signals on line 6. The energies in spectral components of rectified signals on line 6 having frequencies greater than 6 or 7 Hz, however, are approximately equal for both burst and continuous seismic signals. These higher frequency spectral components therefore do little to aid in distinguishing between burst and continuous seismic signals and detecting a man walking in a protected area. Rather, the presence of these spectral components tends to bias circuitry such that the stated energy difference in the aforementioned lower frequency spectral components on line 6 is more difficult to detect. Also, there is very little energy from any source of seismic signals in spectral components of a rectified signal on line 6 having frequencies of less than 0.5 Hz. The DC component in a rectified seismic signal on line 6 also biases circuitry to make the stated low frequency energy difference more difficult to detect. Filter 7 is therefore preferably a bandpass filter having a lower cutoff frequency blocking the DC component of a rectified signal on line 6 and an upper cutoff frequency blocking the high frequency spectral components. The lower and upper cutoff frequencies are preferably >0.1 Hz and <10 Hz, respectively. In an embodiment of this invention that was built and tested, filter 7 was a two-stage bandpass filter having a 1–4 Hz passband and a rolloff of 12 db per octave. This lower cutoff frequency corresponds to a time constant of 0.16 second. Referring now to FIG. 3, filter 7 may be a two-stage filter wherein each stage comprises reactive and resistive elements and an operational amplifier. The structure, design considerations and operation of this filter are described in "Swift Sure Design of Active Bandpass Filters," Electronic Design News, Jan. 15, 1970, pp. 43–50.

Envelope detector 9 also preferably comprises a full-wave rectifier which causes all variations of the filtered signal 7' to be of the same polarity (see the waveform 9" in broken lines in FIG. 2E) and a low pass filter on the output thereof for smoothing out the variations in the rectified signal 9" for producing the envelope signal 9' (see the solid curve in FIG. 2E). Circuit 9 may also be a half-wave rectifier or other nonlinear detector. Integrator 11 may be a simple resistor-capacitor integrator preferably having a long integration time with respect to the time constant of circuit 7. This integration time is preferably long compared to the time between footsteps but less than the time required for a man to walk through the detection range of geophone 1. The time constant of integrator 11 may, by way of example, be 10 seconds. The signal stored by the integrator is represented by the waveform 11' in FIG. 2F. Alarm device 14 may, by way of example, be a bell or lamp.

The operation of the system will now be described in relation to the waveforms in FIG. 2 which represent signals produced by associated components of the system in response to a walking man producing burst seismic vibrations in the earth. These vibrations are detected by the geophone which produces the electrical burst seismic signals 1' (see FIG. 2A) on line 2 that are amplified and filtered. Spectral components of the seismic signal 1' having frequencies within the 10–40 Hz passband of filter 3 comprise the filtered signal 3' (see FIG. 2B). The shapes of the signals 1' and 3' are similar. The filtered signals 3' are rectified by detector 5 to produce the rectified and envelope signals 5" and 5', respectively, (see FIG. 2C) and are filtered by bandpass circuit 7 to produce the signal 7' (see FIG. 2D). Spectral components of envelope signals 5' (see FIG. 2C) having frequencies within the 1–4 Hz passband of filter 7 comprise the filtered signals 7' which are rectified by detector 9. The energy in the rectified signals 9' (see FIG. 2E) are summed by the integrator to produce the signal 11' (see FIG. 2F). If a sufficient number of burst seismic signals 1' are present during the 10 second integration time of circuit 11, the amplitude of the signal 11' exceeds the threshold level $V_T$ (see FIG. 2F) of circuit 12 and alarm device 14 is energized to indicate that seismic signals 1' are burst seismic signals.

What is claimed is:

1. Apparatus for detecting intrusion of a protected area of a medium by discriminating between burst and continuous seismic vibrations produced in the medium, comprising a seismic sensor associated with the medium and having an area of detection defining the protected area of the medium, said sensor being responsive to seismic vibrations in the protected area of the medium for producing associated seismic signals, means for passing a first signal having spectral components of the seismic signals with frequencies greater than a prescribed low frequency limit and corresponding to frequencies of strong spectral components in a burst seismic signal produced by a walking man, said passing means comprising automatic gain control circuitry for maintaining a measure of the amplitude of the seismic signal essentially constant, means for converting the first signal to a second broadband signal comprising spectral components having frequencies less than said low frequency limit, means for detecting the energy in a band of low frequency spectral components comprising the second signal, said frequency band of the detecting means having a high frequency limit less than said low frequency limit of said passing means, and means for indicating that the sensed seismic vibrations are burst seismic vibrations and intrusion of the protected area when said detected energy is greater than a prescribed threshold level.

2. Apparatus according to claim 1 wherein said detecting means comprises a first filter having an upper cutoff frequency of less than 10 Hz corresponding to the high frequency limit, a first envelope detector responsive to the output signal of said first filter, and an integrator summing the output signal of said first envelope detector over a time interval that is long compared to the time between footsteps of a walking man.

3. Apparatus according to claim 2 wherein said passing means comprises a second filter having a bandpass frequency response and a lower cutoff frequency of greater than 5 Hz corresponding to the low frequency limit.

4. Apparatus according to claim 3 wherein said converting means comprises a second envelope detector having a nonlinear frequency response characteristic.

5. Apparatus according to claim 4 wherein said first filter has a bandpass frequency response and an associated lower cutoff frequency of greater than 0.5 Hz.

6. Apparatus according to claim 4 wherein said first filter is a bandpass filter and has a lower cutoff frequency of approximately 1 Hz and an upper cutoff frequency of < 6 Hz.

7. A seismic signal processor for discriminating between burst and continuous seismic signals comprising a first bandpass filter responsive to a seismic signal for passing a first signal comprising spectral components having frequencies corresponding to the frequencies of strong spectral components of a burst seismic signal produced by a walking man, said first filter having a lower cutoff frequency of greater than 5 Hz, automatic gain control circuitry for maintaining essentially constant in the first signal a measure of the amplitude of the seismic signal, a detector having a nonlinear frequency response relationship and being responsive to the first signal for producing a second signal comprising low frequency spectral components having frequencies of less than the lower cutoff frequency of said first filter, means for detecting the energy in low frequency spectral components of the second signal, and a threshold circuit responsive to the output of said detecting means for indicating that the seismic signal is a burst seismic signal when said energy is greater than a prescribed threshold level.

8. The processor according to claim 7 wherein said detecting means detects the energy in spectral components of the second signal having frequencies less than the lower cutoff frequency of said first filter.

9. The processor according to claim 7 wherein said detecting means comprises a second bandpass filter responsive to the second signal, and having a lower cutoff frequency of greater than 0.5 Hz and an upper cutoff frequency of less than 10 Hz, a second detector having a nonlinear frequency response characteristic for rectifying the filtered signal from said second bandpass filter, and an integrator for summing the rectified signal over a time interval that is long compared to the time between footsteps of a walking man.

10. The processor according to claim 9 wherein said second filter has upper and lower cutoff frequencies of approximately 1 and 5 Hz, respectively.

* * * * *